United States Patent [19]

Shiba et al.

[11] Patent Number: 5,216,644
[45] Date of Patent: Jun. 1, 1993

[54] APPARATUS FOR REPRODUCING INFORMATION WITH DIFFERENT SCANNING MODES

[75] Inventors: Takahumi Shiba; Hirokazu Inotani, both of Tokorozawa, Japan

[73] Assignee: Pioneer Electronic Corporation, Tokyo, Japan

[21] Appl. No.: 837,748

[22] Filed: Feb. 18, 1992

[30] Foreign Application Priority Data

Feb. 21, 1991 [JP] Japan .................... 3-27541

[51] Int. Cl.⁵ ............... G11B 17/22; G11B 19/00; G11B 15/18
[52] U.S. Cl. ............................ 369/32; 369/27; 369/39; 360/72.2
[58] Field of Search ............ 369/32, 27, 39, 30, 369/19, 47, 33, 54, 100, 69; 360/72.2, 77.13, 72.1, 73.3, 32

[56] References Cited

U.S. PATENT DOCUMENTS

| | | | |
|---|---|---|---|
| 4,644,515 | 2/1987 | Allebest et al. | 369/32 |
| 4,899,331 | 2/1990 | Masaki et al. | 369/32 |
| 4,922,476 | 5/1990 | Kiyoura et al. | 369/32 X |
| 4,991,159 | 2/1991 | Tomoda et al. | 369/19 |
| 5,126,987 | 6/1992 | Shiba et al. | 369/32 |

Primary Examiner—Robert J. Pascal
Assistant Examiner—Ali Neyzari
Attorney, Agent, or Firm—Kane, Dalsimer, Sullivan, Kurucz, Levy, Eisele and Richard

[57] ABSTRACT

An information recording apparatus such as a CD player successively plays back portions of pieces of information, such as musical information, recorded in respective information storage mediums, such as CDs, over a predetermined period of time in a disc highlight scanning mode, and also successively plays back portions of the pieces of information recorded in any one of the information storage mediums in a track highlight scanning mode. The information recording apparatus has a system controller for selecting one, at a time, of the disc and track highlight scanning modes in response to a signal from a scan key of an input keyboard. Specifically, the system controller selects the disc highlight scanning mode in response to a signal from the scan key, and thereafter selects the track highlight scanning mode in response to another signal from the scan key.

9 Claims, 5 Drawing Sheets

APPARATUS FOR REPRODUCING INFORMATION WITH DIFFERENT SCANNING MODES

BACKGROUND OF THE INVENTION

1. Field of the Invention

The present invention relates to an apparatus for reproducing information from an information storage medium which stores a plurality of various items of information, and more particularly to an improved apparatus for scanning and reproducing a plurality of pieces of musical information that are recorded in memory locations divided by address information on an information storage medium.

2. Description of the Prior Art

Various information storage mediums including a CD (compact disc), an LVD (laser vision disc), DAT (digital audio tape), etc. store a plurality of pieces of information, e.g., a plurality of pieces of musical information, recorded successively as time-series information in memory locations that are divided or specified by address (relative address) information. The user of such an information storage medium may sometimes want to know the contents of a plurality of recorded pieces of information within a short period of time. A CD player, for example, has various additional modes of operation, or added functions, in addition to the essential mode of playing back the recorded pieces of musical information. One of the additional modes of operation is known as an introduction scanning mode. The introduction scanning mode allows the user to confirm what musical pieces are recorded on a CD or to give brief information of recorded musical pieces that the user wishes to listen to, by successively playing back the introductions of musical pieces (tracks) TNo. 1, TNo. 2, each for a predetermined period of time, e.g., 10 seconds, as shown in FIG. 5 of the accompanying drawings.

Another known scanning mode is also employed in an information reproducing apparatus such as a CD single player or the like which plays back a single source (information storage medium). In this scanning mode, the information reproducing apparatus successively plays back portions of recorded musical pieces, which are about 1 minute after the introductions of the first, second, third, musical pieces, each over about 10 seconds. The scanning mode permits the user to know the contents of the recorded information, such as the titles of the recorded musical pieces, more quickly than in the introduction scanning mode.

As described above, there have been known conventional information reproducing apparatus with the latter scanning mode that play back a single source or information storage medium. However, any commercially available information reproducing apparatus such as multiple CD players which play back a plurality loaded sources or information storage mediums have no such scanning mode. If the scanning mode were added to an information reproducing apparatus for playing back a plurality of information storage mediums, then the information reproducing apparatus would be required in the scanning mode to browse through all musical pieces successively in a plurality of sources, bybrowsing through the musical pieces in a first source, then through the musical pieces in a second source, and so on. Therefore, it would take a long period of time for the user to find a desired musical piece or pieces in the loaded source.

SUMMARY OF THE INVENTION

In view of the aforesaid drawbacks of the conventional information reproducing apparatus, it is an object of the present invention to provide an information reproducing apparatus which is capable of quickly and efficiently browsing through recorded pieces of information, such as recorded musical pieces, in the playback of a plurality of information storage mediums.

According to the present invention, there is provided an apparatus for reproducing information from a plurality of information storage mediums each storing a plurality of pieces of information recorded as time-series information in memory locations that are specified by address information, comprising first means for successively playing back portions of pieces of information recorded in the respective information storage mediums over a predetermined period of time in a first mode of operation, second means for successively playing back portions of the pieces of information recorded in any one of the information storage mediums in a second mode of operation, and third means for selecting one, at a time, of the first mode of operation and the second mode of operation.

The apparatus may comprise a CD player for playing back a plurality of loaded CDs as information storage mediums, for example. The third means, which comprises a system controller, is responsive to a signal from a single scan key to select the first mode of operation, which is a disc highlight scanning mode, or the second mode of operation, which is a track highlight scanning mode. In the disc highlight scanning mode, the pieces of information stored in the CDs can briefly be detected. Based on the information detected in the disc highlight scanning mode, the user may control the system controller to select the track highlight scanning mode which briefly detects the pieces of information recorded in any particular one of the loaded CDs. Therefore, the user can quickly and efficiently browse through the recorded pieces of information in the CDs simply by selecting the disc and track highlight scanning modes.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

An information reproducing apparatus according to the present invention, which is embodied as a CD player, is shown in FIGS. 1 through 4.

Figure 1:
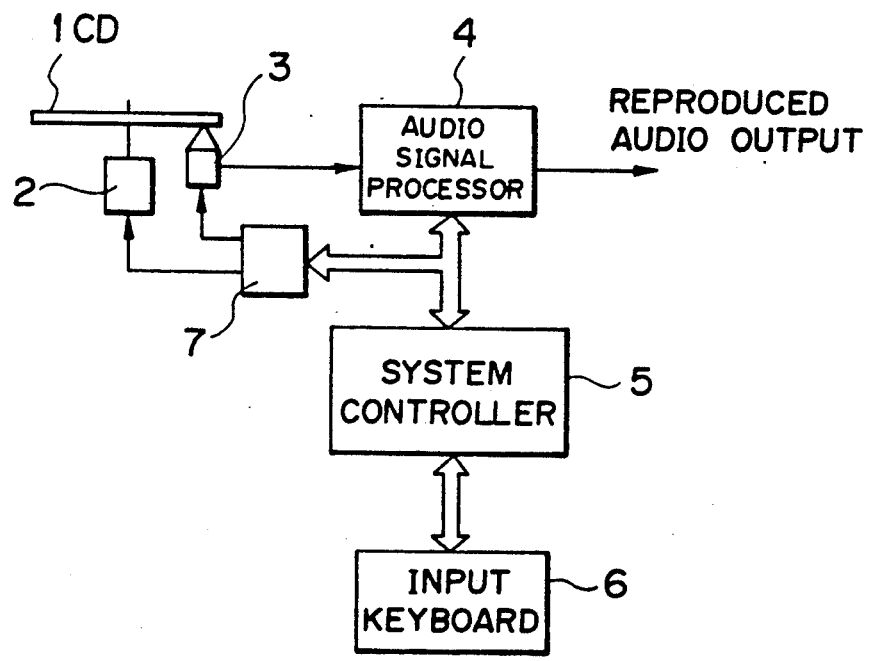
FIG. 1 is a block diagram of a CD player as an information reproducing apparatus according to the present invention.

As shown in FIG. 1, the CD player comprises a spindle motor 2 for rotating a CD 1 as an information storage medium about its own axis, an optical pickup 3 for optically reading recorded audio information from the CD 1 while it is rotating, and an audio signal processor 4 for amplifying, demodulating, converting read digital signals into analog signals to output reproduced audio information. The spindle motor 2 is controlled by a system controller 5 through a servo system 7 for tracking servo control and spindle motor servo control. The optical pickup 3 is also controlled by the system controller 5 through the servo system 7 for focus servo control. Operation commands can be inputted to the system controller 5 through an input keyboard 6 that is manually operated on by the user of the CD player.

Figure 2:
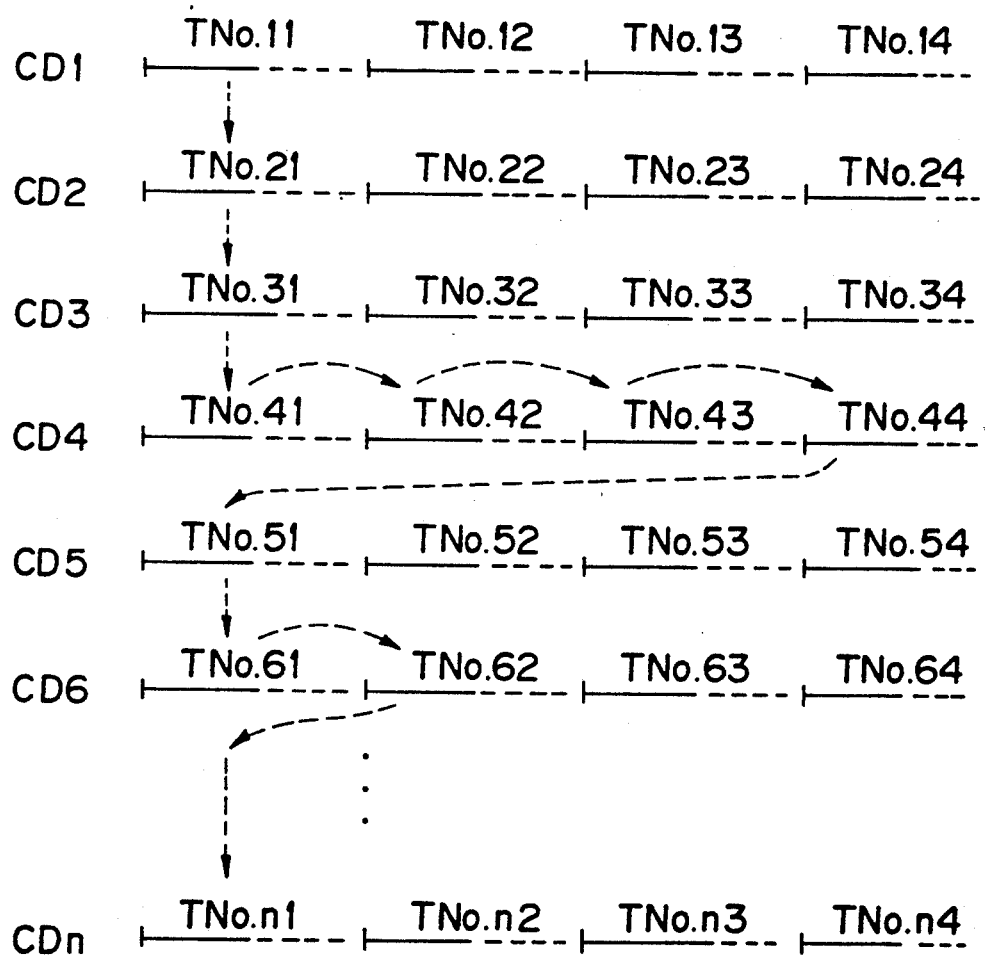
FIG. 2 is a diagram illustrative of operation of a system controller of the CD player shown in FIG. 1.

The system controller 5 comprises a CPU that operates according to a predetermined control program to control a scanning mode of operation as shown in FIG. 2. When a scan key of the input keyboard 6 is pressed, the system controller 5 successively plays back musical information that continues over a certain period of time (e.g., 10 seconds) from a predetermined period of time (e.g., 1 minute) in the first musical pieces among the musical pieces TNo. 11, . . . TNo. 41 that are recorded in a plurality of CDs that are loaded in the CD player. This scanning mode is referred as a disc highlight scanning mode. If the scan key of the input keyboard 6 is pressed again while the first musical piece TNo. 41 of the disc 4, for example, is being played back in the disc highlight scanning mode, then the system controller 5 successively plays back portions of the musical pieces that each continue over a certain period of time (e.g., 10 seconds) from a certain position which is a predetermined period of time (e.g., 1 minute) after the introductions of the respective musical pieces TNo. 41, TNo. 42, . . . TNo. 44 that are recorded in the CD 4. This scanning mode is referred as a track highlight scanning mode.

If the scan key of the input keyboard 6 is pressed once more while the portion of the musical piece TNo. 44, for example, is being played back in the track highlight scanning mode, then the system controller 5 leaves the track highlight scanning mode and enters the disc highlight scanning mode again, and plays back musical information over a certain period of time (e.g., 10 seconds) in the first musical pieces among the musical pieces TNo. 51, TNo. 61, in the CD 5, CD 6, loaded in the CD player.

In this manner, the musical information contained in the loaded CDs 1—n is detected in the disc highlight scanning mode, and any desired one of the musical pieces recorded in any one (e.g., the CD 5) of the loaded CDs 1 n can be detected in the track highlight scanning mode. Therefore, the user can quickly and efficiently detect any desired musical piece recorded in the loaded CDs.

Operation of the CD player will be described in greater detail with reference to FIGS. 3 and 4.

Figure 3:
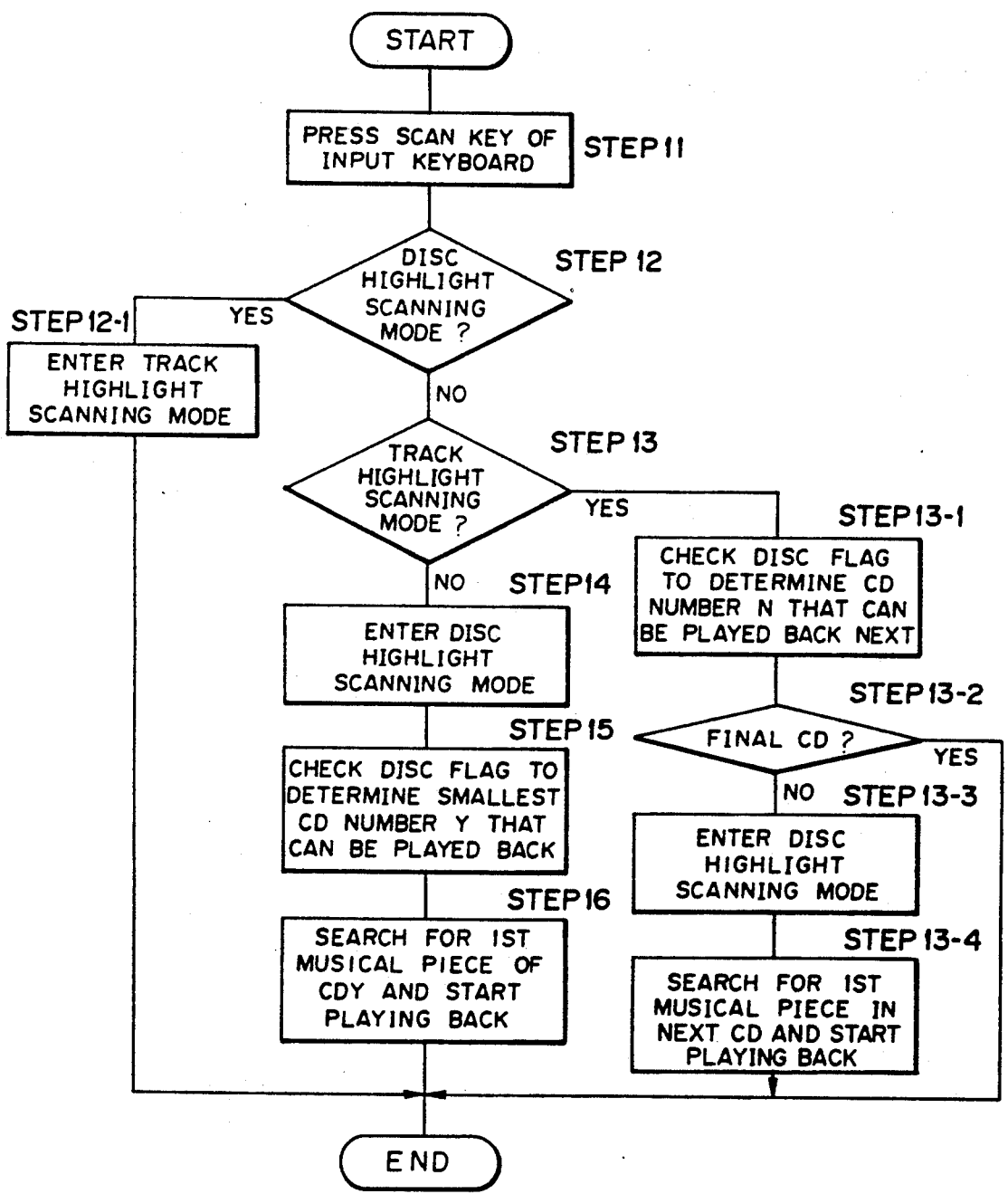
FIG. 3 is a flowchart of a scanning mode of operation which is initiated when a scan key is pressed.
Figure 4:
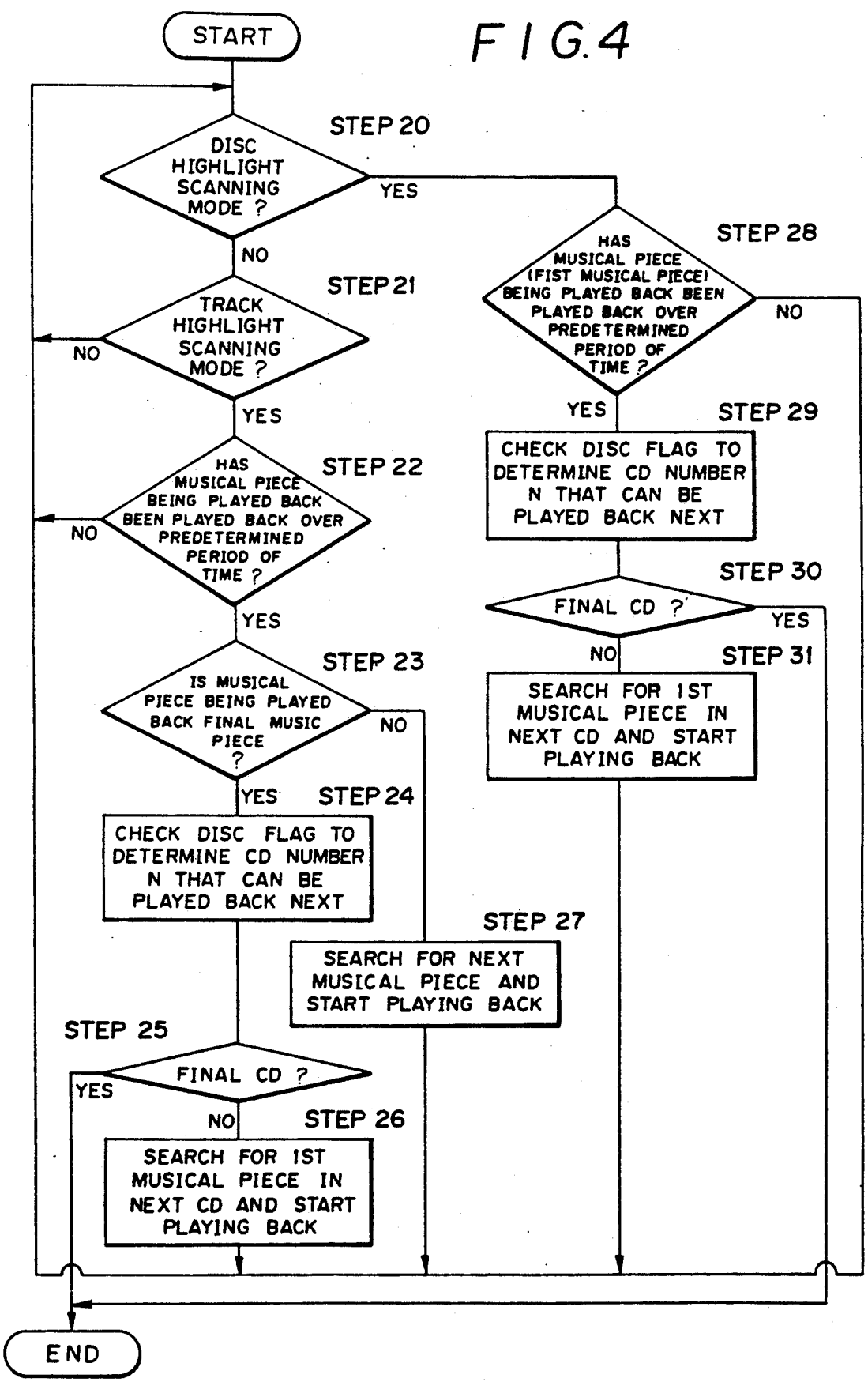
FIG. 4 is a flowchart of a playback process in the scanning mode.
Figure 5:
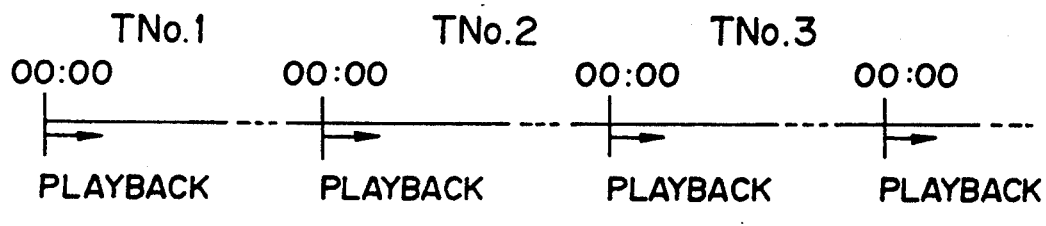
FIG. 5 is a diagram illustrative of operation of a conventional information reproducing apparatus.

FIG. 3 shows an operation sequence of the system controller 5 when the scan key is pressed. FIG. 4 shows an operation sequence of the system controller in each of the scanning modes.

When the scan key of the input keyboard 6 is pressed in a step 11, the system controller 5 determines whether the current scanning mode is the disc highlight scanning mode or not in a step 12. If the current scanning mode is not the disc highlight scanning mode in the step 12, then the system controller 5 determines whether the current scanning mode is the track highlight scanning mode or not in a step 13. If the current scanning mode is not the track highlight scanning mode in the step 13, then the system controller 5 sets the operation mode to the disc highlight scanning mode in a step 14. Thereafter, the system controller 5 checks a disc flag, which indicates the presence or absence of a disc, to determine the smallest number Y of a CD that can be played back in a step 15. Then, the system controller 5 searches for the first musical piece recorded in the CD of the smallest number Y, and starts playing back the musical information in a step 16.

If the current scanning mode is the track highlight scanning mode in the step 13, then the system controller 5 checks a disc flag to determine the number N of a CD that can be played back next in a step 13-1. Then, the system controller 5 determines whether the CD of the number N is the final CD or not in a step 13-2. If the CD of the number N is not the final CD in the step 13-2, then the system controller 5 enters the disc highlight scanning mode in a step 13-3. The system controller 5 searches for the first musical piece recorded in a next CD, and starts playing back the musical information in a step 13-4. If the CD of the number N is the final CD in the step 13-2, then the system controller 5 operates in the track highlight scanning mode with respect to the final CD, and control goes to an end.

If the current scanning mode is the disc highlight scanning mode in the step 12, then the system controller 5 enters the track highlight scanning mode in a step 12-1. The above operation sequence shown in FIG. 3 is executed each time the scan key of the input keyboard 6 is pressed.

The operation sequence of each of the scanning modes will be described below with reference to FIG. 4.

The system controller 5 determines whether the current scanning mode is the disc highlight scanning mode or not in a step 20. If the current scanning mode is not the disc highlight scanning mode in the step 20, then the system controller 5 determines whether the current scanning mode is the track highlight scanning mode or not in a step 21. If the current scanning mode is the track highlight scanning mode in the step 21, then the system controller 5 determines whether a musical piece being currently played back has been played back over a predetermined period of time or not in a step 22. If the musical piece being currently played back has been played back over the predetermined period of time in the step 22, then the system controller 5 determines whether the musical piece being currently played back is the final recorded musical piece or not in a step 23. If the musical piece is the final musical piece in the step 23, then the system controller 5 checks a disc flag to determine the number N of a CD that can be played back next in a step 24. Then, the system controller 5 determines whether the CD of the number N which is being played back is the final CD or not in a step 25. If the CD of the number N being played back is not the final CD in the step 25, then the system controller 5 searches for the first musical piece recorded in a next CD, and starts playing back the musical information in a step 26. If the CD of the number N is the final CD in the step 25, then the system controller 5 ends the scanning operation. If the current scanning mode is not the track highlight scanning mode in the step 21, or if the musical piece being currently played back has not yet been played back over the predetermined period of time in the step 22, or after the next CD has been played back in the step 26, control returns to the step 20 to repeat the scanning operation.

If the musical piece being played back is not the final musical piece in the step 23, then the system controller 5 searches for a next musical piece in the CD and starts playing back the next musical piece in a step 27. Thereafter, control returns to the step 20 to repeat the scanning operation.

If the current scanning mode is the disc highlight scanning mode in the step 20, then the system controller 5 determines whether the musical piece being currently played back (i.e., the first musical piece) has been played back over a predetermined period of time or not in a step 28. If the musical piece being currently played back has been played back over the predetermined period of time in the step 28, then the system controller 5 checks a disc flag to determine the number N of a CD that can be played back next in a step 29. Then, the system controller 5 determines whether the CD of the number N which is being played back is the final CD or not in a step 30. If the CD of the number N being played back is not the final CD in the step 30, then the system controller 5 searches for the first musical piece recorded in a next CD, and starts playing back the musical information in a step 31. If the musical piece being currently played back has not yet been played back over the predetermined period of time in the step 28, then control returns to the step 20 to repeat the scanning operation. If the CD of the number N is the final CD in the step 30, then the system controller 5 ends the scanning operation.

In the above illustrated embodiment, switching between the disc highlight scanning mode and the track highlight scanning mode is effected by the single scan key of the input keyboard 6. However, the input keyboard 6 may have two scan keys associated respectively with the disc and track highlight scanning modes, and one of the disc and track highlight scanning modes may be selected in response to depression of the corresponding scan key.

In the above embodiment, the disc highlight scanning mode plays back certain portions or phrases of the first musical pieces of the plurality of CDs 1—n, successively over a certain period of time. However, the disc highlight scanning mode may play back musical pieces or information belonging to most characteristic portions of the plurality of CDs 1—n successively over a certain period of time.

In the above embodiment, the track highlight scanning mode plays back certain portions or phrases which are a predetermined period of time after the introductions of the musical pieces of a certain CD, successively over a certain period of time. However, the track highlight scanning mode may play back characteristic portions of the musical pieces of the CD successively over a certain period of time.

In the above embodiment, the information storage medium has been described as being a CD. However, the information storage medium may comprise an LVD, DAT, or the like which stores a plurality of pieces of information, e.g., a plurality of pieces of musical information, recorded successively as time-series information in memory locations that are divided or specified by address information.

Although a certain preferred embodiment of the present invention has been shown and described in detail, it should be understood that various changes and modifications may be made therein without departing from the scope of the appended claims.

What is claimed is:

1. An apparatus for reproducing information from a plurality of information storage mediums each storing a plurality of pieces of information recorded as time-series information in memory locations that are specified by address information, comprising:
   first means for successively playing back portions of pieces of information recorded in the respective information storage mediums over a predetermined period of time in a first mode of operation;
   second means for successively playing back portions of the pieces of information recorded in any one of the information storage mediums in a second mode of operation; and
   third means for selecting one, at a time, of said first mode of operation and said second mode of operation.

2. An apparatus according to claim 1, wherein said first means comprises means for successively playing back portions of first pieces of information recorded in the respective information storage mediums, over said predetermined period of time in said first mode of operation.

3. An apparatus according to claim 1, wherein said second means comprises means for successively playing back portions of the pieces of information which are a predetermined period of time after beginnings of the pieces of information recorded in any one of the information storage mediums, over said predetermined period of time in said second mode of operation.

4. An apparatus according to claim 1, further including a single command key operable to apply a selection signal to said third means, said third means comprising means for selecting said first mode of operation in response to a selection signal from said single command key and thereafter selecting said second mode of operation in response to another selection signal from said single command key.

5. An apparatus according to claim 1, further including two command keys corresponding to the respective first and second modes, said third means comprising means for selecting said first and second modes of operation in response to selection signals from the respective command keys.

6. An apparatus according to claim 1, wherein said first means comprises means for successively playing back most characteristic portions of the pieces of information recorded in the respective information storage mediums, over said predetermined period of time in said first made of operation.

7. An apparatus according to claim 1, wherein said second means comprises means for successively playing back most characteristic portions of the pieces of information recorded in any one of the information storage mediums, over said predetermined period of time in said second mode of operation.

8. An apparatus according to claim 1, wherein:
   said second means is adapted to stop playing back and said first means is adapted to start playing back when said first mode is selected by said third means during said second mode of operation; and said first means is adapted to stop playing back and said second means is adapted to start playing back when said second mode is selected by said third means during said first mode of operation.

9. An apparatus according to claim 1, wherein said second means is adapted, when said second means finishes playing back portions of all the pieces of information recorded in one information storage medium, to start playing back portions of the pieces of information recorded in another information storage medium in said second mode of operation.

* * * * *